J. EDMAN.
RESILIENT WHEEL.
APPLICATION FILED FEB. 21, 1908.
932,976. Patented Aug. 31, 1909.
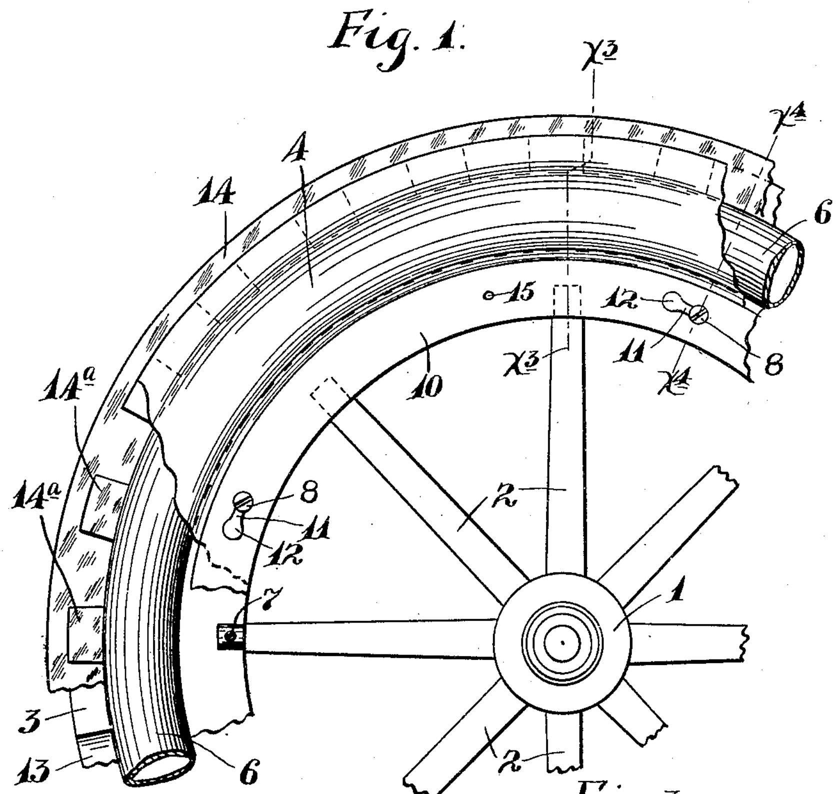
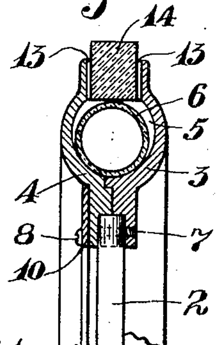
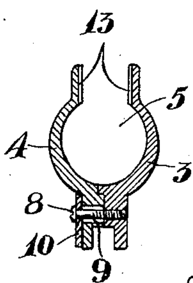
Fig. 3.
Witnesses.
Harry Opsahl.
R. P. Hicks.
Inventor
John Edman.
By his Attorneys.
Williamson Merchant

UNITED STATES PATENT OFFICE.

JOHN EDMAN, OF MINNEAPOLIS, MINNESOTA, ASSIGNOR, BY DIRECT AND MESNE ASSIGNMENTS, OF TWO-THIRDS TO ALFRED M. HOVLAND AND ONE-THIRD TO OLE N. NELSON, BOTH OF MINNEAPOLIS, MINNESOTA.

RESILIENT WHEEL.

932,976. Specification of Letters Patent. Patented Aug. 31, 1909.

Application filed February 21, 1908. Serial No. 417,008.

*To all whom it may concern:*

Be it known that I, JOHN EDMAN, a citizen of the United States, residing at Minneapolis, in the county of Hennepin and State of Minnesota, have invented certain new and useful Improvements in Resilient Wheels; and I do hereby declare the following to be a full, clear, and exact description of the invention, such as will enable others skilled in the art to which it appertains to make and use the same.

My invention relates to resilient wheels and has for its especial object to provide improved means for preventing puncturing of a pneumatic tire, while preserving the resilience of the wheel, due to the use thereof.

To the above ends the invention consists of the novel devices and combinations of devices hereinafter described and defined in the claim.

The invention is illustrated in the accompanying drawings, wherein like characters indicate like parts throughout the several views.

Referring to the drawings, Figure 1 is a fragmentary view in side elevation, showing a wheel constructed in accordance with my invention. Fig. 2 is a transverse section taken on the line $x^3$ $x^3$ of Fig. 1. Fig. 3 is a plan view of a portion of the rim; and Fig. 4 is a detail, with parts broken away, taken in transverse section on the line $x^4$ $x^4$ of Fig. 1.

The numeral 1 indicates the hub and the numeral 2 the spokes of the wheel.

The wheel rim proper is made up of annular metallic plates 3—4 that are reversely bulged outward in cross section to form an endless channel 5 adapted to receive a pneumatic tire 6. The inner flanges of the rim sections 3 and 4 are preferably formed with an overlapping joint, and they are also formed with seats that receive and closely fit the ends of the wheel spokes 2. The flange of the rim section 3 is rigidly secured to the ends of the spokes, as shown, by screws 7, while the rim section 4 is detachably connected to the said rim section 3 and to the said spokes. This detachable connection is preferably accomplished by headed studs or screws 8 that are rigidly secured to the inner flange of the rim section 3 and are projected freely through the perforations 9 of the inner flange of the rim section 4. The said perforations 9 are of such size that they permit the heads of the studs 8 to freely pass therethrough. A lock ring 10 is seated against the outer face of the inner flange of the rim section 4 and is provided with lock slots 11 having enlarged ends 12, through which the heads of the studs 8 are adapted to be freely passed. When this ring is turned so that the slots 11 engage under the heads of the studs 8, the two sections of the wheel rim are locked together as shown in the drawings, but when the said lock ring is turned so that the enlargements 12 are alined with the heads of the studs 8 the said lock ring may be moved laterally from working position, thereby releasing the rim section 4 so that the latter may also be moved laterally off from the studs 8 and from working position. The outer flanges of the rim sections 3 and 4 are parallel and their inner faces are, as shown, formed with radial spacing and guiding grooves 13.

The wheel tread is formed from a single continuous piece 14 of solid rubber, as shown formed rectangular in cross section and arranged to fit between the outer flanges of the rim sections 3 and 4 and to bear against the outer portion of the pneumatic tube 6. To prevent creeping or circumferential movement of the tread rim 14 it is provided, on its side faces, with integral guide lugs or bosses $14^a$ of substantially rectangular form that work in the radial grooves 13 of the rim sections 3 and 4. To hold the lock ring 10 in its operative position shown in Fig. 1, a pin or split key 15 may be passed through co-incident perforations in the said ring and in the inner flange of the rim sections 3 and 4. This tread piece 14 in itself has considerable elasticity and, hence, cushioning action, but the main cushioning action will be taken by the inflated pneumatic tube 6. The distance between the inner faces of the outer flanges is less than that between the bulged portions of the rim sections. The pneumatic tube 6 has a certain amount of side clearance in the channel 5, as shown in Fig. 2, and the flat inner face of the tread-piece 14 rests tangentially against the inner tube, said tread-piece being guided freely in radial direction by the devices described above.

As is evident, when the two sections 3 and 4 of the wheel rim are locked together, the pneumatic tube or inner cushioning tube and the outer yielding tread section are securely held in working position in such manner that they can not be accidentally displaced, but at the same time are capable of such movements as are required to give resilience to the wheel. The resilient or yielding tread forms such close joints with the rim sections 3 and 4 that dirt cannot get into the annular seat which contains the pneumatic tire. When the lock ring 10 is removed from the headed studs 8 the detachable rim section 4 may also be removed laterally from working position, thus making it an easy matter to either remove the pneumatic tube and tread from working positions or to place the same in working positions.

As is evident, the construction above described affords a pneumatic wheel having its tire so protected that it cannot be punctured by anything over which the wheel may run and, at the same time, gives a wheel having great resilience and durability.

What I claim is:

In a resilient wheel, the combination of rim sections arranged side by side and secured together, said sections being provided with intermediate outwardly bulged portions forming between them a channel, parallel flanges extending from the bulged portions of said rim sections and having grooves extending completely across their inner faces in a direction radially of the wheel, a pneumatic tube seated in said channel between the rim sections with a certain amount of clearance therein, and a solid tread-piece of rectangular cross section having guide lugs or bosses formed integral therewith at its side faces and engaging the grooves of the flanges in order to guide said tread-piece freely in inward and outward direction, said tread-piece having its side faces located within the channel in close proximity to the inner faces of said flanges and resting directly at its inner face on the pneumatic tube.

In testimony whereof I affix my signature in presence of two witnesses.

JOHN EDMAN.

Witnesses:
H. D. Kilgore,
F. D. Merchant.